US011904460B2

United States Patent
Fujioka et al.

(10) Patent No.: US 11,904,460 B2
(45) Date of Patent: Feb. 20, 2024

(54) ROBOT LINEAR-OBJECT UNIT AND LINEAR-OBJECT ROUTING METHOD

(71) Applicant: FANUC CORPORATION, Yamanashi (JP)

(72) Inventors: Naoki Fujioka, Yamanashi (JP); Yuuto Tochio, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 118 days.

(21) Appl. No.: 17/038,421

(22) Filed: Sep. 30, 2020

(65) Prior Publication Data
US 2021/0143619 A1    May 13, 2021

(30) Foreign Application Priority Data

Nov. 13, 2019  (JP) ................... 2019-205329

(51) Int. Cl.
*B25J 19/00* (2006.01)
*B25J 9/12* (2006.01)

(52) U.S. Cl.
CPC .............. *B25J 19/0029* (2013.01); *B25J 9/12* (2013.01)

(58) Field of Classification Search
CPC ...................... B25J 19/0029; B25J 19/0025
See application file for complete search history.

(56) References Cited

U.S. PATENT DOCUMENTS 5,065,062 A * 11/1991 Uehara ................ B25J 19/0029
310/90
5,212,432 A * 5/1993 Ohtani ..................... B25J 9/046
901/49

(Continued)

FOREIGN PATENT DOCUMENTS

DE          3630731 A1 *  3/1987
EP       1 602 459 A1    12/2005
(Continued)

OTHER PUBLICATIONS

Wikipedia contributors. (Oct. 15, 2019). Cable gland. In Wikipedia, The Free Encyclopedia. Retrieved 21:08, Jun. 3, 2022, from https://en.wikipedia.org/w/index.php?title=Cable_gland&oldid=921306725 (Year: 2019).*

(Continued)

*Primary Examiner* — Joseph Brown
(74) *Attorney, Agent, or Firm* — Maier & Maier, PLLC

(57) ABSTRACT

A robot linear-object unit includes: a first part including cables, which lead to motors, that are covered by a flexible sheath having a circular outer shape in cross section; a second part including the cables in a loose state at one end of the first part; a plurality of third parts each including one or more of the cables of the second part bundled together for a connector connected to corresponding one of the motors, the third parts being covered by flexible covering materials having circular outer shapes in cross section; and a casing that accommodates the second part and is fixed to a movable part. The casing is provided with a plurality of through holes that allow the first and the third parts to pass through the casing. Spaces between the through holes, the sheath, and the covering materials are fixed in a liquid-tight state by cable glands.

9 Claims, 8 Drawing Sheets

(56) References Cited

U.S. PATENT DOCUMENTS

| | | | | |
|---|---|---|---|---|
| 6,014,909 | A * | 1/2000 | Fiora | B25J 17/0291 |
| | | | | 901/29 |
| 6,477,913 | B1 * | 11/2002 | Akeel | B25J 19/0079 |
| | | | | 901/49 |
| 11,167,432 | B2 * | 11/2021 | Mizukoshi | H01R 31/005 |
| 2004/0237154 | A1 * | 11/2004 | Hezel | B25J 19/0083 |
| | | | | 901/29 |
| 2006/0104790 | A1 | 5/2006 | Inoue et al. | |
| 2009/0200432 | A1 | 8/2009 | Inoue et al. | |
| 2010/0264174 | A1 | 10/2010 | Anderson, Jr. | |
| 2014/0137685 | A1 * | 5/2014 | Iwayama | B25J 19/0025 |
| | | | | 901/27 |
| 2015/0027262 | A1 * | 1/2015 | Okahisa | B25J 18/00 |
| | | | | 29/857 |
| 2016/0297081 | A1 * | 10/2016 | Watanabe | B25J 19/0025 |
| 2017/0072573 | A1 | 3/2017 | Motokado et al. | |
| 2017/0282381 | A1 | 10/2017 | Inoue et al. | |
| 2018/0154528 | A1 * | 6/2018 | Saitou | B25J 19/063 |
| 2019/0329428 | A1 * | 10/2019 | Sakurai | H02G 11/00 |
| 2020/0156239 | A1 * | 5/2020 | Fujioka | B25J 19/0029 |
| 2020/0290212 | A1 * | 9/2020 | Fujioka | H02G 11/00 |
| 2021/0066846 | A1 * | 3/2021 | Uematsu | H01R 27/00 |

FOREIGN PATENT DOCUMENTS

| | | |
|---|---|---|
| JP | S63052989 A | 3/1988 |
| JP | 2001-311495 A | 11/2001 |
| JP | 2002-186133 A | 6/2002 |
| JP | 2005-342860 A | 12/2005 |
| JP | 2017-056501 A | 3/2017 |
| JP | 2017-185580 A | 10/2017 |
| JP | 2018-046616 A | 3/2018 |
| KR | 101093166 B1 * | 12/2011 |
| WO | 2010/141300 A2 | 12/2010 |

OTHER PUBLICATIONS

KR 101093166 B1 (Sungsam Lee) Dec. 12, 2011 (Full Text). [online] [retrieved on Jan. 23, 2023]. Retrieved from ProQuest Dialog. (Year: 2011).*

DE 3630731 A1 (Hiroshi Godai) Mar. 19, 1987 (full text). [online] [retrieved on Apr. 5, 2023]. Retrieved from ProQuest Dialog (Year: 1987).*

* cited by examiner

ROBOT LINEAR-OBJECT UNIT AND LINEAR-OBJECT ROUTING METHOD

CROSS-REFERENCE TO RELATED APPLICATIONS

This application is based on Japanese Patent Application No. 2019-205329, the content of which is incorporated herein by reference.

FIELD

The present invention relates to a robot linear-object unit and a linear-object routing method.

BACKGROUND

There is a known linear-object routing method in which cables for controlling a motor that drives a second arm relative to a first arm and a motor that drives a wrist are routed in a form bundled together as a single linear object from a rotation axis via the first arm (for example, refer to Japanese Unexamined Patent Application Publication No. 2017-185580).

SUMMARY

An aspect of the present invention is directed to a robot linear object unit that includes: a first part including cables, which lead to a plurality of motors of a robot, that are covered by a flexible sheath having a circular outer shape in cross section; a second part including the cables in a loose state that have had the sheath removed therefrom at one end of the first part; a plurality of third parts each including one or more of the cables of the second part bundled together for a connector connected to corresponding one of the motors, the third parts being covered by flexible covering materials having circular outer shapes in cross section; and a casing that accommodates the second part and is fixed to a movable part of the robot. The casing is provided with a plurality of through holes that allow the first part and the third parts to pass therethrough. Spaces between the through holes, the sheath, and the covering materials are fixed in a liquid-tight state by cable glands.

DETAILED DESCRIPTION OF EMBODIMENTS

Figure 1:
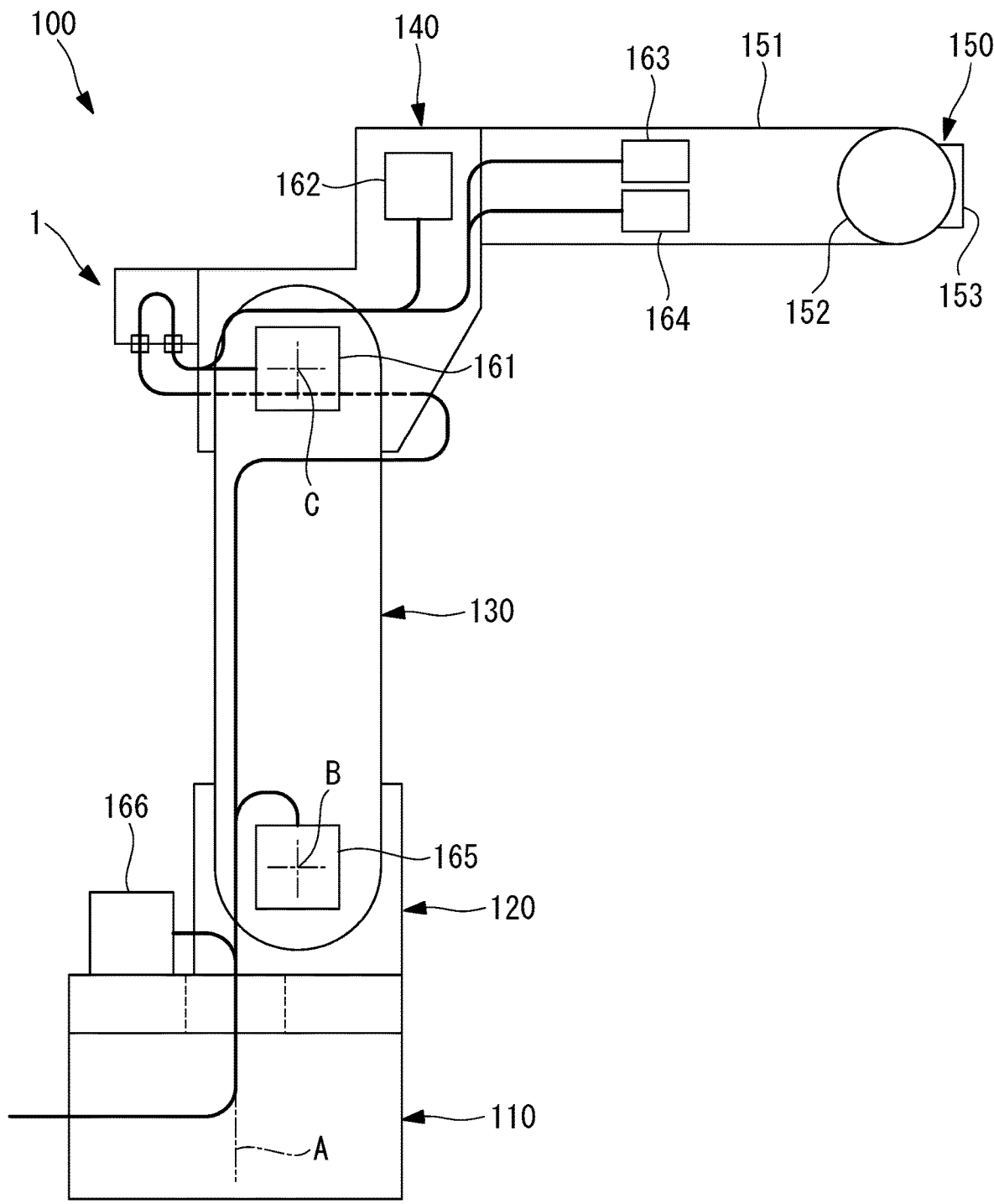
FIG. 1 is a side view illustrating a robot that includes a linear object unit according to an embodiment of the present invention.

A robot linear-object unit 1 and a linear-object routing method according to an embodiment of the present invention will be described below while referring to the drawings.

The linear object unit 1 according to this embodiment is, for example, attached to a vertical multi-jointed robot (hereafter, "robot") 100 illustrated in FIG. 1.

In the example illustrated in FIG. 1, the robot 100 includes a base 110 that is installed on a floor surface and a rotary body 120 that can rotate around a vertical first axis A relative to the base 110. The robot 100 further includes a first arm 130 that can rotate relative to the rotary body 120 around a horizontal second axis B, a second arm (movable part) 140 that can rotate relative to the first arm 130 around a horizontal third axis C, and a three-axis wrist unit 150 that is attached to a distal end of the second arm 140.

Figure 2:
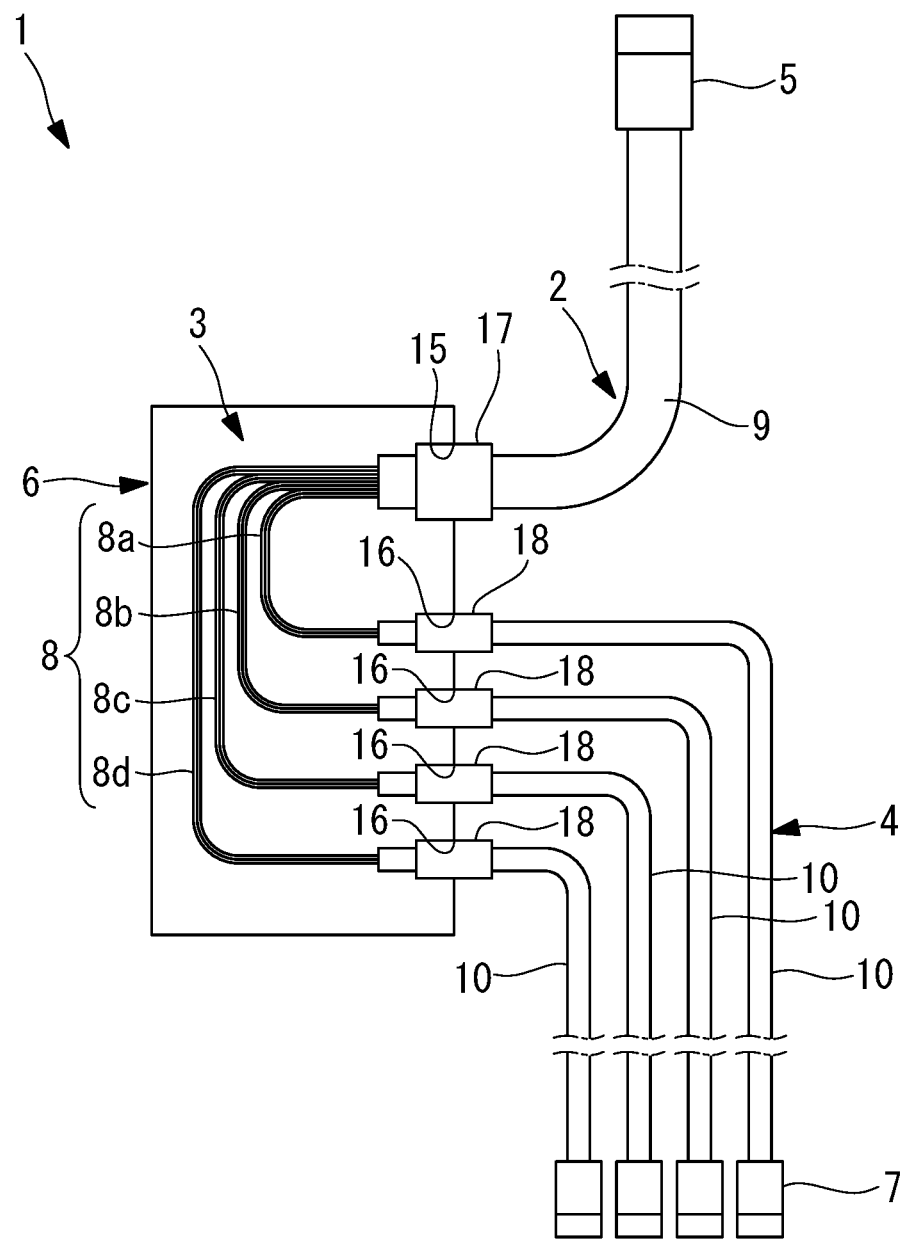
FIG. 2 is a diagram illustrating an example of the linear object unit in FIG. 1.

As illustrated in FIG. 2, the linear object unit 1 includes a first part 2 having a connector 5 attached to one end thereof, a plurality of third parts 4 each having a connector 7 attached to one end thereof, a second part 3 arranged between the first part 2 and the third parts 4, and a casing 6 that houses the second part 3.

Figure 3:
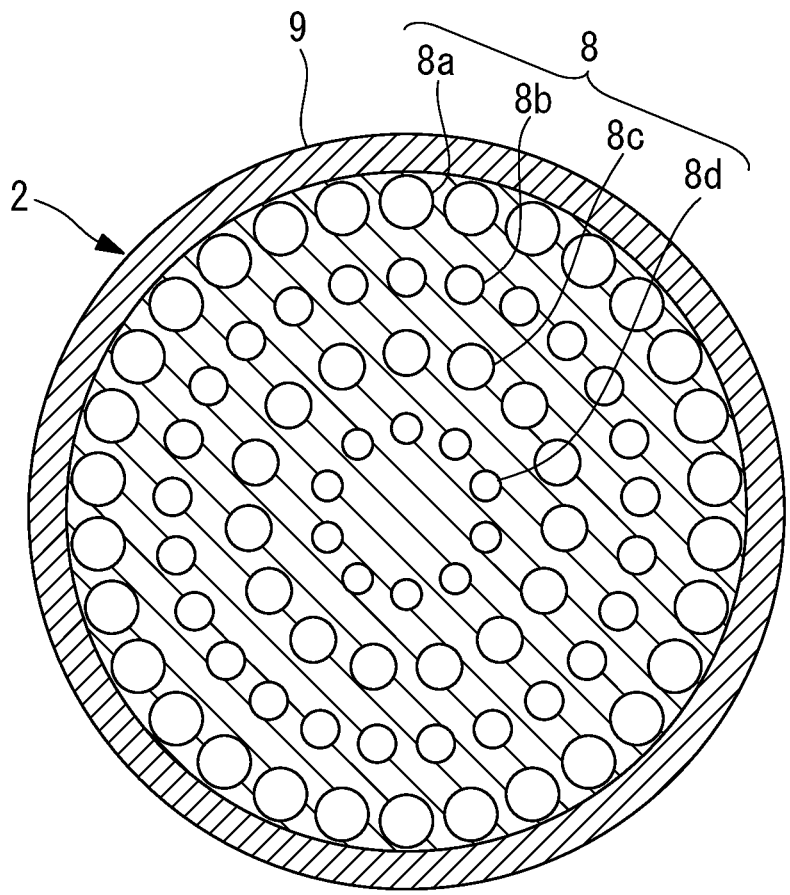
FIG. 3 is a cross-sectional view illustrating an example of a first part of the linear object unit in FIG. 1.

As illustrated in FIG. 3, the first part 2 includes a plurality of cables 8 and a sheath (covering material) 9 that covers the cables 8 in a bundled together state. The cables 8 in the first part 2 include four cable groups (cables) 8a, 8b, 8c, and 8d that are connected to a motor 161 for rotationally driving the second arm 140 relative to the first arm 130 and motors 162, 163, and 164 for driving three wrist shafts 151, 152, and 153 of the wrist unit 150. The sheath 9 of the first part 2 is, for example, composed of a flame-retardant rubber material, holds the plurality of cables 8 bundled together, and has a circular outer shape in cross section. In FIG. 1, reference symbol 165 indicates a motor that is for rotationally driving the first arm 130 relative to the rotary body 120, and reference symbol 166 indicates a motor for rotationally driving the rotary body 120 relative to the base 110.

The linear object covered by the sheath 9 may include air tubes, I/O signal cables, and so forth in addition to the cables 8 to be connected to the motors 161, 162, 163, and 164. The second part 3 is a part where the plurality of cables 8 are in a loose state due to the removal of the sheath 9 at the other end of the first part 2. The plurality of cables 8, which are held bundled together by the sheath 9 in the first part 2, are separated from each other in the second part 3 into the cable groups 8a, 8b, 8c, and 8d for the four motors 161, 162, 163 and 164.

Figure 4:
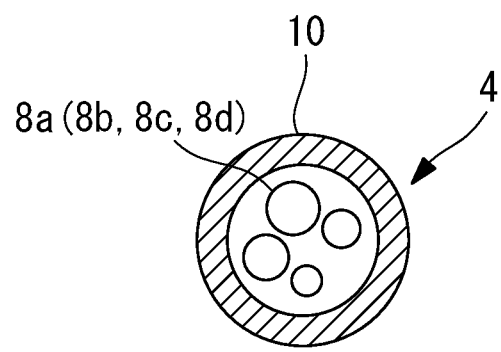
FIG. 4 is a cross-sectional view illustrating an example of a third part of the linear object unit in FIG. 1.

As illustrated in FIG. 4, the third parts 4 are parts in which the four cable groups 8a, 8b, 8c, and 8d, which are separated from each other in the second part 3, are housed inside flexible piping tubes (covering materials) 10 such as air tubes. The piping tubes 10 have a circular outer shape in cross section when no external forces are applied thereto.

As illustrated in FIG. 2, the connectors 7, which are for realizing connections to the motors 161, 162, 163, and 164, are connected to the ends of the four cable groups 8a, 8b, 8c, and 8d in the third parts 4. In addition, the ends of the piping tubes 10 covering the cable groups 8a, 8b, 8c, and 8d are inserted into boots provided in the connectors 7 and are tightened to a liquid-tight state using, for example, binding means such as nylon bands.

Figure 5:
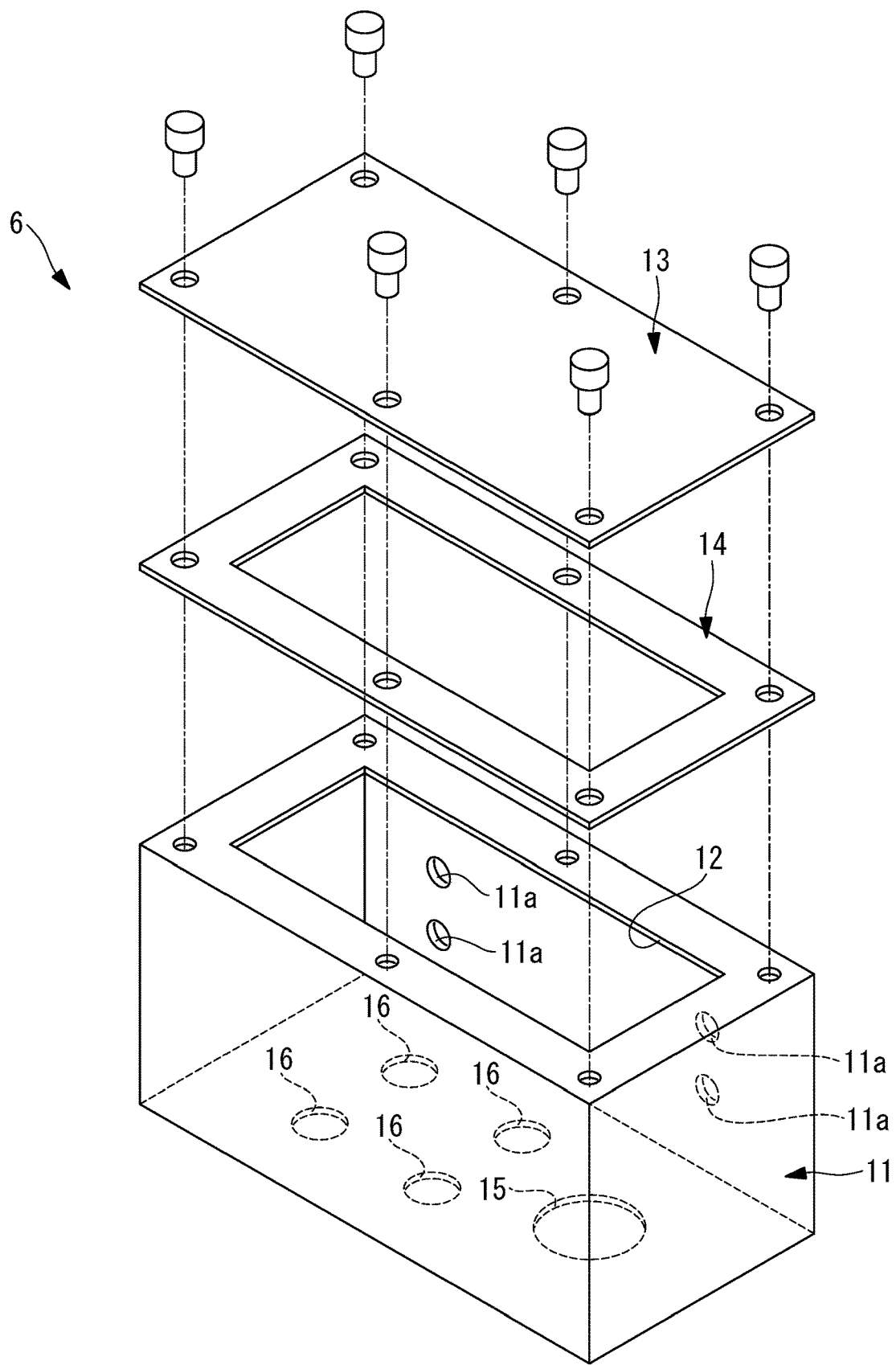
FIG. 5 is an exploded perspective view illustrating an example of a casing of the linear object unit in FIG. 1.

As illustrated in FIG. 5, the casing 6, for example, includes a rectangular-parallelepiped box-shaped casing body 11 formed of metal sheets and having an opening 12 in one surface thereof and a lid 13 that can be removed from and attached to the casing body 11 and is capable of closing the opening 12. A seal member 14, which seals the entire outer periphery of the opening 12 in a liquid-tight state, is sandwiched between the lid 13 and the casing body 11.

The casing body 11 is provided with a plurality of through holes 15 and 16 that allow the first part 2 and the third parts 4 to pass therethrough and attachment holes 11a that are for attaching the casing body 11 to the robot 100. Cable glands 17 and 18 are provided in the through holes 15 and 16.

Figure 6:
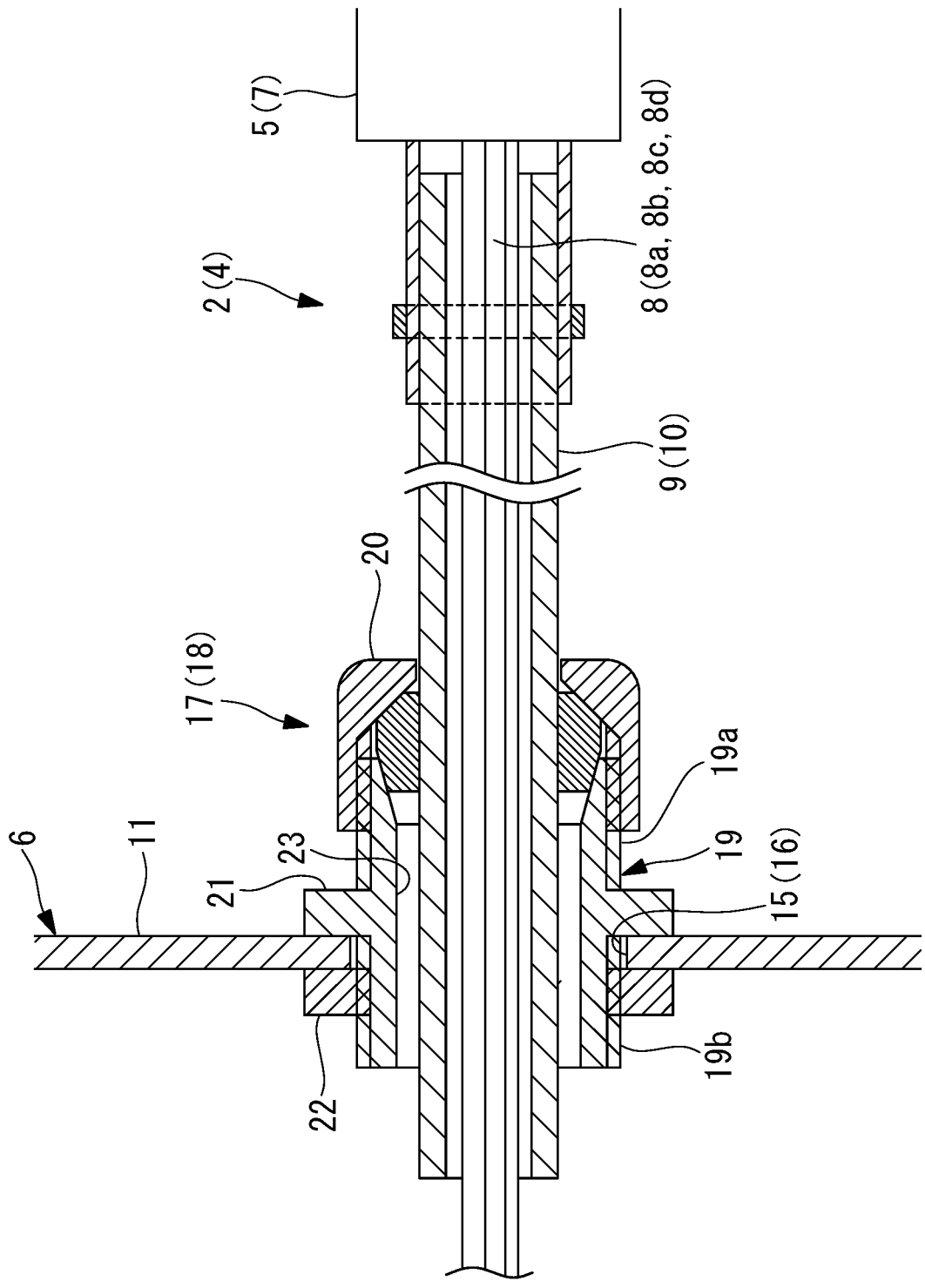
FIG. 6 is a lengthwise sectional view illustrating an example of a cable gland fixed to the casing in FIG. 5.

As illustrated in FIG. 6, the cable glands 17 and 18 each include a cylindrical body portion 19 that is fixed to the through hole 15 or 16 and a cap nut 20 that is fastened onto a male screw thread 19a provided at one end of the body portion 19. The body portion 19 includes a flange 21 that extends radially outward, and the body portion 19 is fixed to the casing 6 as a result of the casing 6 being sandwiched between a nut 22, which is fastened to a male screw thread 19b provided at the other end of the body portion 19, and the flange 21.

Furthermore, the distal end of the body portion 19 is deformed radially inward as a result of the first part 2 or the third part 4 being made to pass through a center hole 23 of the body portion 19 and the cap nut 20 being fastened thereto. Thus, the inner surface of the body portion 19 presses against the outer surface of the sheath 9 of the first part 2 or the outer surface of the piping tube 10 of the third part 4 all the way around and a liquid tight seal can be realized therebetween.

Next, a linear-object routing method for a robot using the thus-configured linear object unit 1 according to this embodiment will be described. In the linear-object routing method according to this embodiment, first, the first part 2, which has been inserted into the space inside the base 110, is pulled through the space inside the rotary body 120 and along the rotary body 120 and is then attached to a side surface of the first arm 130 while ensuring there is an extra length required for rotation of the first arm 130 relative to the rotary body 120. The first part 2 may be attached to the rotary body 120 and the first arm 130 by fixing the first part 2 to metal plates fixed to the rotary body 120 and the first arm 130 using binding means such as nylon bands.

Next, the first part 2, which is arranged longitudinally along the side surface of the first arm 130, is attached to the second arm 140 while maintaining an extra length required for rotation of the second arm 140 relative to the first arm 130. The first part 2 is attached to the second arm 140 by fixing the casing 6 to the second arm 140 using attachment screws.

As illustrated in FIG. 1, regarding the position at which the casing 6 is attached to the second arm 140, the casing 6 is preferably fixed to an end surface of the second arm 140 on the opposite side from the wrist unit 150 with the third axis C interposed therebetween. Furthermore, when a linear object feeder or the like is arranged at the base end of the second arm 140, the linear object feeder is preferably arranged at a position that does not interfere with the attachment of the casing 6. Next, the connectors 7 of the four cable groups 8a, 8b, 8c, and 8d of the third parts 4 that extend from the casing 6 are respectively connected to connectors of the corresponding motors 161, 162, 163, and 164. The linear object can be arranged in this manner.

Thus, according to the robot linear-object unit 1 and linear-object routing method according to this embodiment, the first part 2 and the third parts 4, which pass through the wall surface of the casing 6 via the through holes 15 and 16, are covered by the sheath 9 and the piping tubes 10, which have a circular outer shape in cross section. As a result, the gaps between the through hole 15 and the first part 2 and between the through holes 16 and the third parts 4 can be sealed in a more liquid-tight state by using the cable glands 17 and 18.

In other words, the second part 3, which is housed inside the casing 6, consists of the cable groups 8a, 8b, 8c, and 8d in a loose state with the sheath 9 removed therefrom, but dust-proof/splash-proof performance is ensured due to the second part 3 being sealed by the casing 6. Furthermore, dust-proof/splash-proof performance is ensured for the first part 2 by the sheath 9 and for the third parts 4 by the piping tubes 10.

In this case, according to the linear object unit 1 of this embodiment, the dust-proof/splash-proof performance of the third parts 4 can be improved more reliably than with heat-shrinkable tubes by simply inserting the cable groups 8a, 8b, 8c, and 8d, each consisting of one or more cables 8 connected to the connectors 7, into the piping tubes 10. In other words, the outer surface of the sheath 9 of the first part 2 and the outer surfaces of the piping tubes 10 of the third parts 4 can be sealed in more optimal states by using the cable glands 17 and 18, which are recommended to have a circular outer shape in cross section.

Compared with heat-shrinkable tubes, the piping tubes 10 have the advantage that there is no need to perform wrapping or heating work on the cable groups 8a, 8b, 8c, and 8d of the third part 4, and thus the dust-proof/splash-proof performance can be improved at low cost without the need for labor. In addition, according to the linear-object routing method of this embodiment, the casing 6 of the linear object unit 1 is fixed to the second arm 140 at a predetermined position and therefore the extra length can be easily secured, particularly when attaching the casing 6 to the second arm 140.

By fixing the casing 6 to the base end side of the second arm 140 relative to the third axis C, the chance of liquid splashing into the casing 6 can be reduced and liquid can be more reliably prevented from flowing into the casing 6 even in an environment where the wrist unit 150 side of the second arm 140 is constantly exposed to liquid.

Figure 7:
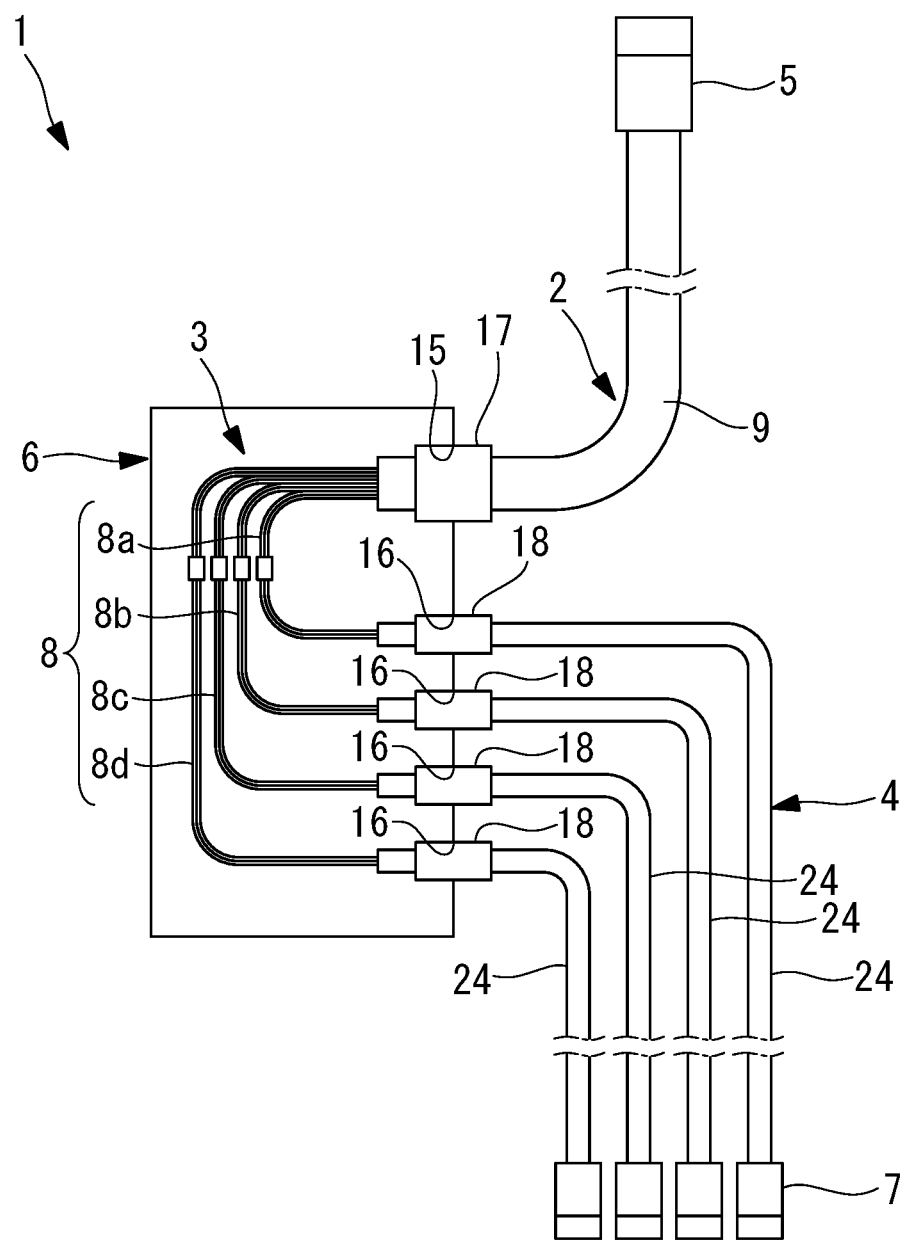
FIG. 7 is a diagram illustrating a modification of a second part of the linear object unit in FIG. 1.

In this embodiment, the third parts 4 are formed by inserting the four cable groups 8a, 8b, 8c, and 8d in a loose state, which constitute the first part 2, into the piping tubes 10. Alternatively, as illustrated in FIG. 7, the third parts 4 may be formed of four linear objects covered by sheaths 24 having a circular cross section and having connectors 7 at one ends thereof connecting to the four motors 161, 162, 163 and 164, as illustrated in FIG. 7. In this case, the loose individual cables 8, which are exposed due to the removal of the sheath 9 at the end of the first part 2, and the loose individual cable groups 8a, 8b, 8c, and 8d, which are exposed due to the removal of the sheath 24 at the end of the third parts 4, may be connected to each other by soldering or the like.

In addition, piping tubes 10 for conveying any liquid such as water or oil may be used as the piping tubes 10 instead of air tubes. The material of the piping tubes 10 can be adjusted as appropriate in accordance with the intended application such as with respect to heat resistance and chemical resistance.

Figure 8:
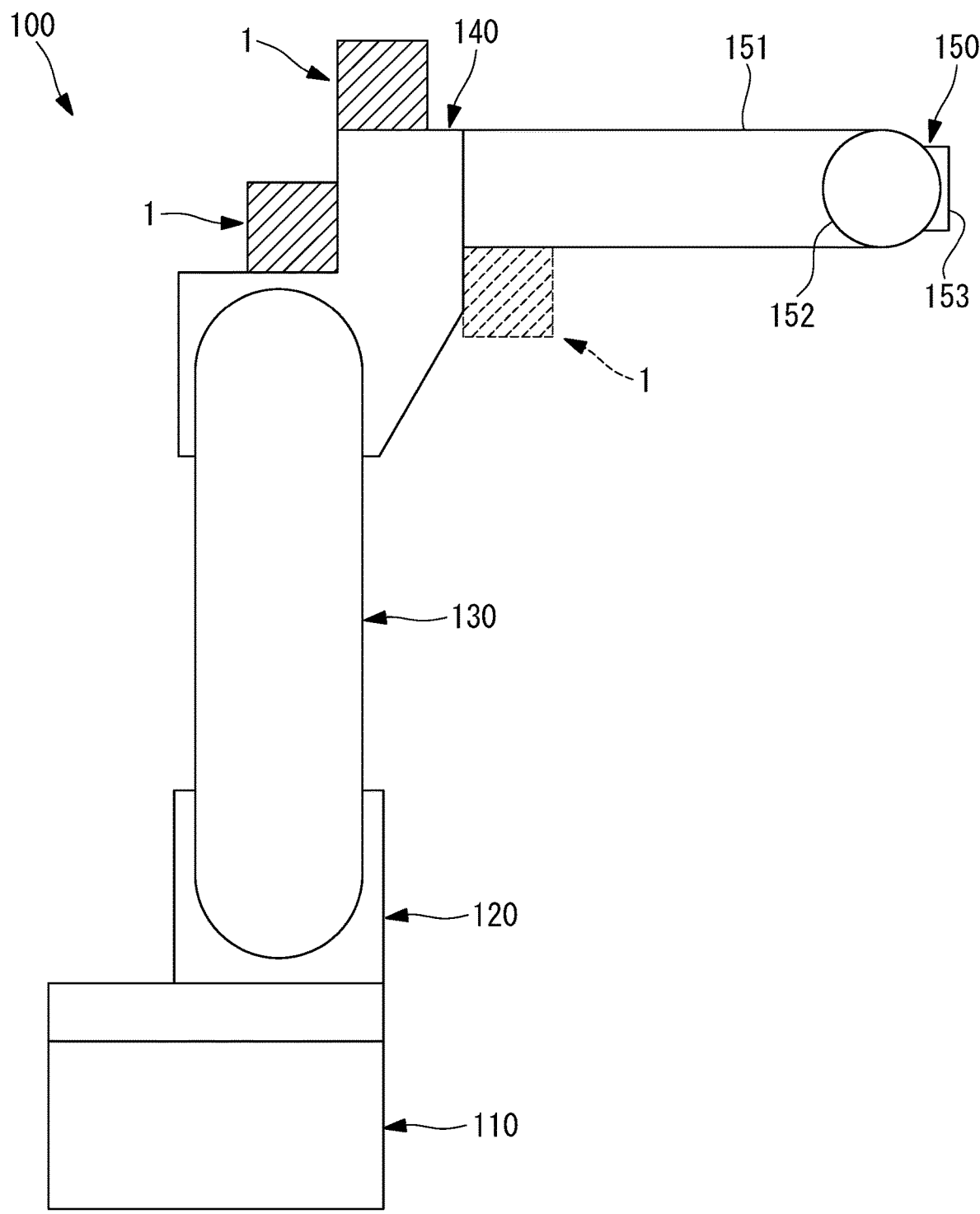
FIG. 8 is a side view illustrating another example of the arrangement of the casing of the linear object unit in FIG. 1.

In addition, in this embodiment, the casing 6 is fixed to the end surface of the second arm 140 on the opposite side from the wrist unit 150 with the third axis C interposed therebetween within the end surface on the base end side of the second arm 140. Alternatively, depending on the intended application of the robot 100 such as a case where no device is mounted on the base end side or a case where an increase in the overall height is not a problem, the casing 6 may be fixed at any position on the base end side of the second arm 140, as indicated by the solid lines in FIG. 8. In addition, as indicated by the broken lines in FIG. 8, the casing 6 may be fixed to the end surface on the same side as the wrist unit 150 relative to the third axis C.

Figure 9:
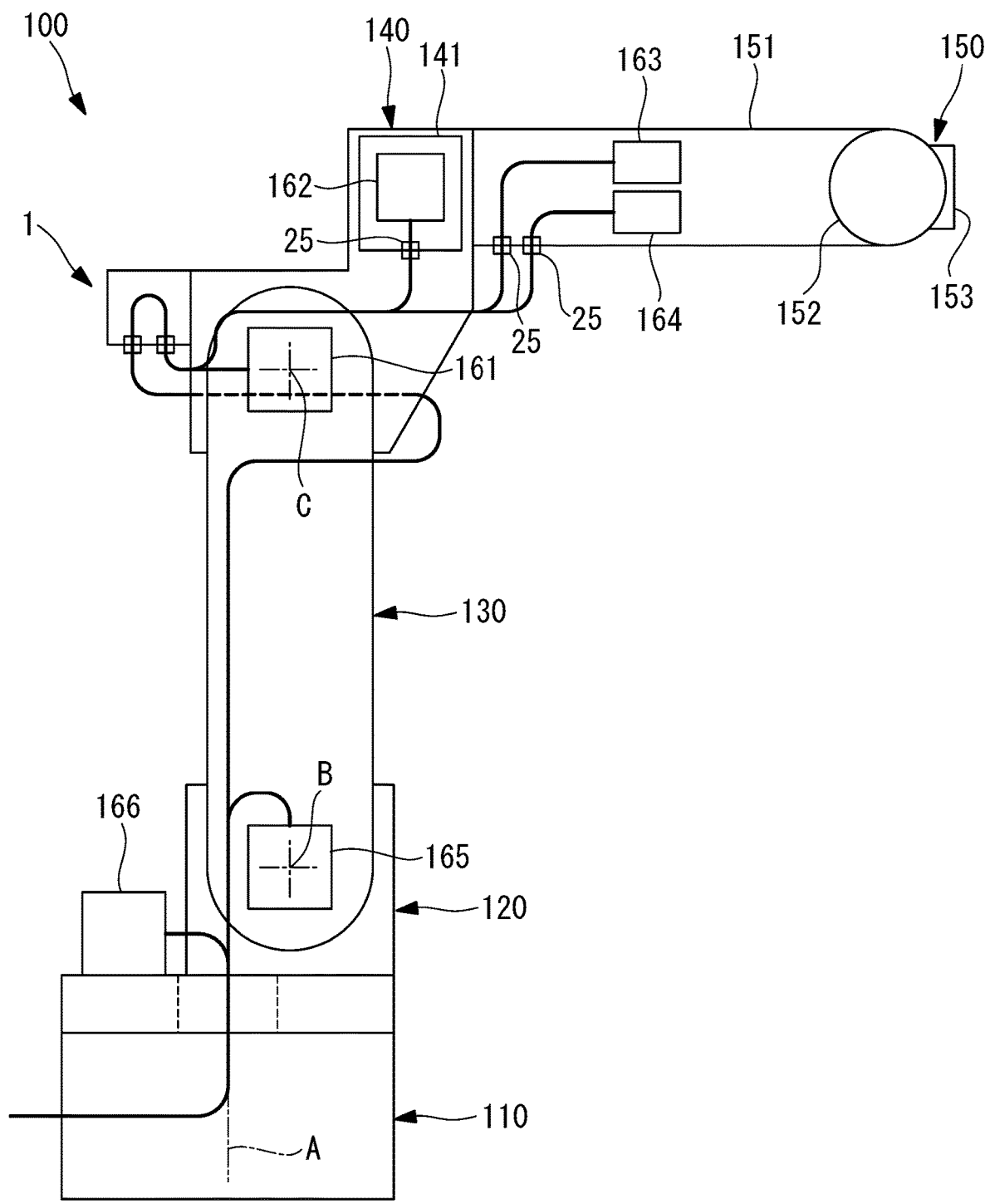
FIG. 9 is a side view illustrating another modification of the linear object unit in FIG. 1.

When the motor 162 is housed in a motor housing 141, as illustrated in FIG. 9, the gaps between the through holes provided in the housing 141 and the third parts 4 may be sealed using cable glands 25. When the motors 163 and 164 are housed within the wrist shaft 151, the gaps between through holes in the wrist shaft 151 and the third parts 4 may also be sealed by the cable glands 25, as illustrated in FIG. 9.

The invention claimed is:

1. A robot linear-object unit comprising:
    a first part comprising a connector and a plurality of cables which are all covered by a flexible sheath having a circular outer shape in cross section and which lead to a plurality of motors of a robot;
    a second part comprising the plurality of cables in a loose state with the sheath removed; and
    a plurality of third parts among which the plurality of cables of the first part are distributed, each of the plurality of third parts comprising a motor connector and one or more of the plurality of cables bundled together for connection to a corresponding one of the plurality of motors, and each of the plurality of third parts are covered by a flexible covering material having circular outer shapes in cross section,
    wherein the second part is accommodated in a casing and is provided between the first part and the plurality of third parts,
    wherein the casing is provided with a plurality of through holes that allow the first part and each of the plurality of third parts to pass therethrough,
    wherein spaces between the through holes, the sheath, and the covering materials are fixed in a liquid-tight state by cable glands,
    wherein the casing comprises a lidded compartment which is attachable to a movable part of the robot,
    wherein the robot comprises: a rotary body that is rotatable around a first vertical axis relative to a base; a first arm that is rotatable relative to the rotary body around a second axis; a second arm that is rotatable relative to the first arm around a third axis; and a wrist unit that is attached to a distal end of the second arm,
    wherein the movable part of the robot is the second arm,
    wherein the first part in which the plurality of cables are all covered by the flexible sheath passes through the base and is fixedly secured to each of the rotary body and the first arm, and
    wherein the casing is fixed to the second arm such that the third axis is between the casing and the wrist unit.

2. The robot linear-object unit according to claim 1, wherein the covering materials are piping tubes.

3. The robot linear-object unit according to claim 1, wherein the covering materials are sheaths.

4. A linear-object routing method using the robot linear-object unit of claim 1, the method comprising:
    routing the first part to the second arm via the base, the rotary body, and the first arm, and
    fixing the casing to the second arm.

5. The robot linear-object unit according to claim 1, wherein the casing is attachable to an exterior of the movable part of the robot.

6. The robot linear-object unit according to claim 1, wherein the lidded compartment comprises a parallelepiped box-shaped casing body to which a lid is attachable and removable.

7. The robot linear-object unit according to claim 6, wherein a seal is provided between the lid and the casing body.

8. The robot linear-object unit according to claim 6, wherein the casing body is provided with at least one attachment hole for attaching the casing body to the movable part of the robot.

9. The robot linear-object unit according to claim 1, wherein the casing is exposed to an environment of the robot so as to protect the second part from at least one of dust and liquid.

* * * * *